UNITED STATES PATENT OFFICE.

EDWARD HORACE SMIRK, OF ST. ANNES-ON-THE-SEA, ENGLAND.

COMPOSITION FUEL AND FIRE-LIGHTER.

1,219,178. Specification of Letters Patent. Patented Mar. 13, 1917.

No Drawing. Application filed June 19, 1916. Serial No. 104,598.

*To all whom it may concern:*

Be it known that I, EDWARD HORACE SMIRK, a subject of the King of Great Britain, residing at St. Annes-on-the-Sea, in the county of Lancaster, in the Kingdom of England, have invented certain new and useful Improvements in Composition Fuel and Fire-Lighters, of which the following is a specification.

This invention has for its object composition fuel and firelighters that can be produced at a very moderate price.

Hitherto pitch has frequently been used as a binding agent in composition fuel and firelighters, the disadvantage of which is that it makes a considerable body of smoke, while many of the substitutes used in place of pitch have been non inflammable and have therefore not given satisfaction. Accordingly my present invention has been designed to produce a composition fuel and firelighters which will avoid these disadvantages.

The composition fuel and firelighters according to my invention are made of coal dust, coke dust, small coal or coke, or other suitable pulverized or reduced carbonaceous matter, and brewers' barm or yeast or other like by-product such as is produced at breweries or yeast factories. These substances with the addition of water are thoroughly incorporated together in suitable proportions into a paste, either by hand or in a mixing machine, and the mixture is formed into blocks or portions or into briquets of suitable size and shape (also compressed if desired) and allowed to dry, or are baked in an oven heated to the desired temperature. The barm or yeast acts not only as a binding or agglomerating agent, but also acts to produce a porosity in the pieces or blocks into which the composition fuel is molded, thus allowing air to percolate through them and so aid combustion. The ingredients of the composition fuel or firelighters may be used in any suitable proportions, according to the firmness or size of the blocks or pieces of fuel or fire-lighters required, but I have found that a very suitable mixture for firm hard blocks or pieces of fuel is to add barm or yeast and water in the proportion of two parts of barm or yeast to one part of water. For firelighters less coal dust, &c., and more barm or yeast would be used. Where greater inflammability is required, the pieces or blocks may be dipped in liquid naphthalene or other like waste hydrocarbons so as to become well penetrated thereby.

In a modification sawdust is added to or used instead of coal dust, &c., or other suitable material may be used instead of sawdust such as peat dust, tanners' spent waste, dyers' waste, coffee husks, spent hops, or other suitable combustible matter. Where sawdust only is used, a suitable mixture is to add to each two pounds of that material, about three pounds of barm.

I declare that what I claim is:—

1. Composition fuel or firelighters, in which brewers' barm or yeast is a constituent.

2. Composition fuel and firelighter, containing brewers' barm or yeast, and a suitable pulverized or reduced carbonaceous matter.

3. Composition fuel or firelighter containing brewers' barm or yeast, sawdust, tanners' spent waste, dyers' waste, coffee husks and spent hops.

4. Composition fuel or firelighter containing barm or yeast as a binding agent, and naphthalene to increase combustion.

5. Composition fuel or firelighter, containing brewers' barm or yeast, coal dust and coke dust.

6. Composition fuel containing brewers' barm or yeast, a suitable pulverized or reduced carbonaceous matter, sawdust, peat dust, tanners' spent waste, dyers' waste, coffee husks, and spent hops.

In witness whereof, I have hereunto signed my name this 2 day of June, 1916, in the presence of two subscribing witnesses.

EDWARD HORACE SMIRK.

Witnesses:
    G. C. DYMOND,
    M. HAILES.

Copies of this patent may be obtained for five cents each, by addressing the "Commissioner of Patents, Washington, D. C."